(12) United States Patent
Lau

(10) Patent No.: US 10,057,844 B2
(45) Date of Patent: Aug. 21, 2018

(54) LOCATION OR SERVICE-BASED DETERMINATION OF RADIO SELECTION RULES

(71) Applicant: T-Mobile USA, Inc., Bellevue, WA (US)

(72) Inventor: Kevin Lau, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 170 days.

(21) Appl. No.: 15/004,555

(22) Filed: Jan. 22, 2016

(65) Prior Publication Data

US 2017/0215135 A1  Jul. 27, 2017

(51) Int. Cl.
*H04W 48/00* (2009.01)
*H04W 48/16* (2009.01)
*H04W 4/021* (2018.01)
*H04W 4/029* (2018.01)

(52) U.S. Cl.
CPC ........... *H04W 48/17* (2013.01); *H04W 4/021* (2013.01); *H04W 4/029* (2018.02); *H04W 48/16* (2013.01)

(58) Field of Classification Search
None
See application file for complete search history.

(56) References Cited

U.S. PATENT DOCUMENTS

| | | | |
|---|---|---|---|
| 2002/0046292 A1 | 4/2002 | Tennison et al. | |
| 2013/0286941 A1 | 10/2013 | Lee et al. | |
| 2016/0157161 A1* | 6/2016 | Miao | H04W 64/00 455/434 |
| 2016/0157168 A1* | 6/2016 | Xue | H04W 48/18 370/329 |
| 2017/0093657 A1* | 3/2017 | Angus | H04L 43/065 |
| 2017/0127373 A1* | 5/2017 | Deshpande | H04W 64/003 |
| 2017/0181050 A1* | 6/2017 | Alfred | H04W 36/30 |
| 2017/0196042 A1* | 7/2017 | Shah | H04W 76/028 |

FOREIGN PATENT DOCUMENTS

| | | |
|---|---|---|
| WO | WO2006068661 A1 | 6/2006 |
| WO | WO2008070690 A1 | 6/2008 |
| WO | WO2010132710 A1 | 11/2010 |

OTHER PUBLICATIONS

PCT Search Report and Written Opinion dated Apr. 21, 2017 for PCT Application No. PCT/US17/13875, 15 pages.

* cited by examiner

*Primary Examiner* — Lonnie V Sweet
(74) *Attorney, Agent, or Firm* — Lee & Hayes, PLLC

(57) ABSTRACT

A telecommunication device described herein receives a set of radio selection rules from an application server. Each radio selection rule in the set is associated with a different location, and at least two radio selection rules in the set are associated with different priority orders of network technologies and frequency bands. Based at least on a location of the telecommunication device, the telecommunication device determines a radio selection rule in the set that is associated with the location. The telecommunication device then scans network technologies and frequency bands in a priority order specified by the determined radio selection rule to determine a network technology and frequency band to connect to.

19 Claims, 5 Drawing Sheets

LOCATION OR SERVICE-BASED DETERMINATION OF RADIO SELECTION RULES

BACKGROUND

Typically, telecommunication devices are programmed at the factory to perform radio selection based on a static set of rules. For instance, a telecommunication device may be programmed to scan for signals of a certain network technology, such as Long Term Evolution (LTE) signals before scanning for signals associated with other network technologies, such as High Speed Packet Access (HSPA), Universal Mobile Telecommunications System (UMTS), or Global System for Mobile Communications (GSM). Further, for a given network technology, a telecommunication device may be programmed to search for certain frequency bands (e.g., 700 MHz for LTE) before others (e.g., 1900 MHz for LTE). This static method of radio selection is not optimal, however, especially as new radio technologies are introduced and spectrum refarming occurs in different areas.

Often, customers endure poor network connection experiences because of the longer time required in order to find and connect to the network when using the static method. For instance, if a user is in an area in which only GSM is available, but the telecommunication device must first scan for LTE and UMTS signals, a needless delay is inflicted on that user. In another example, other network technologies (e.g., LTE, UMTS) may be available to that user, but may be very congested, again resulting in poor experience as the user waits through connection attempts to these congested technologies before scanning for a network technology that is available and not congested (e.g., GSM). The ill effects of this static method don't end with poor user experience; they also result in a significant drain on battery resources.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, a telecommunication device configured to receive a set of radio selection rules from an application server. Each radio selection rule in the set is associated with a different location, and at least two radio selection rules in the set are associated with different priority orders of network technologies and frequency bands. Based at least on a location of the telecommunication device, the telecommunication device determines a radio selection rule in the set that is associated with the location. The telecommunication device then scans network technologies and frequency bands in the priority order specified by the determined radio selection rule to determine a network technology and frequency band to connect to.

In various implementations, the application server receives, for each location of a plurality of locations, performance metrics for network technologies and frequency bands at that location. The performance metrics may be received from either or both of telecommunication devices or crowdsourcing (e.g., social media, really simple syndication (RSS) feeds, the Internet, etc.). The application server then creates or updates priority orders of network technologies and frequency bands in radio selection rules respectively associated with the plurality of locations based on the received performance metrics. Upon creating or updating the radio selection rules and their priority orders, the application server provides the radio selection rules to at least one telecommunication device.

Overview

Figure 1:
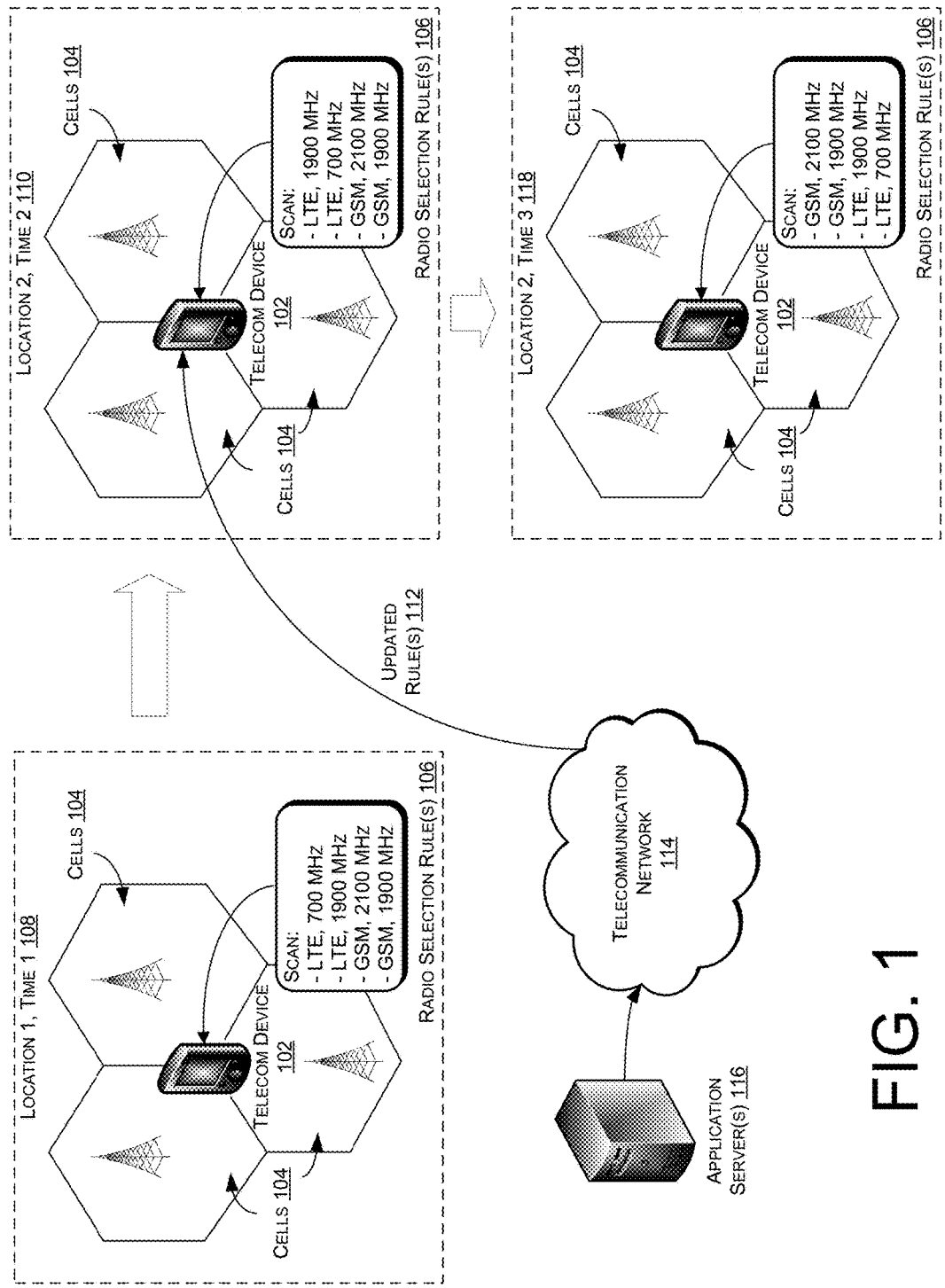
FIG. 1 illustrates an overview and example environment, including a telecommunication device, a telecommunication network, and an application server, the telecommunication device receiving a set of radio selection rules from the application server, determining one of those radio selection rules based on a location of the telecommunication device, and scanning network technologies and frequency bands of the telecommunication network in a priority order specified by the determined radio selection rule.

FIG. 1 illustrates an overview and example environment, including a telecommunication device, a telecommunication network, and an application server, the telecommunication device receiving a set of radio selection rules from the application server, determining one of those radio selection rules based on a location of the telecommunication device, and scanning network technologies and frequency bands of the telecommunication network in a priority order specified by the determined radio selection rule. As illustrated, a telecommunication device 102 proximate to one or more cells 104 at a location may scan for signals associated with different network technologies and frequency bands based on radio selection rule(s) 106. At a first location and first time 108, the telecommunication device 102 may determine radio selection rule 106 based on that first location. At a second location and at a later, second time 110, the telecommunication device 102 may utilize a different radio selection rule 106 based on the second location. The different radio selection rule 106 may include a different priority order of network technologies or frequency bands. At that same second location but at a third, later time 118, the telecommunication device may utilize an updated radio selection rule 106. The updated radio selection rule 106 may have been received at 112 via a telecommunication network 114 from an application server 116 between the first time and the later, second time. The updated radio selection rule 106 may include a different priority order of network technologies or frequency bands.

Figure 2:
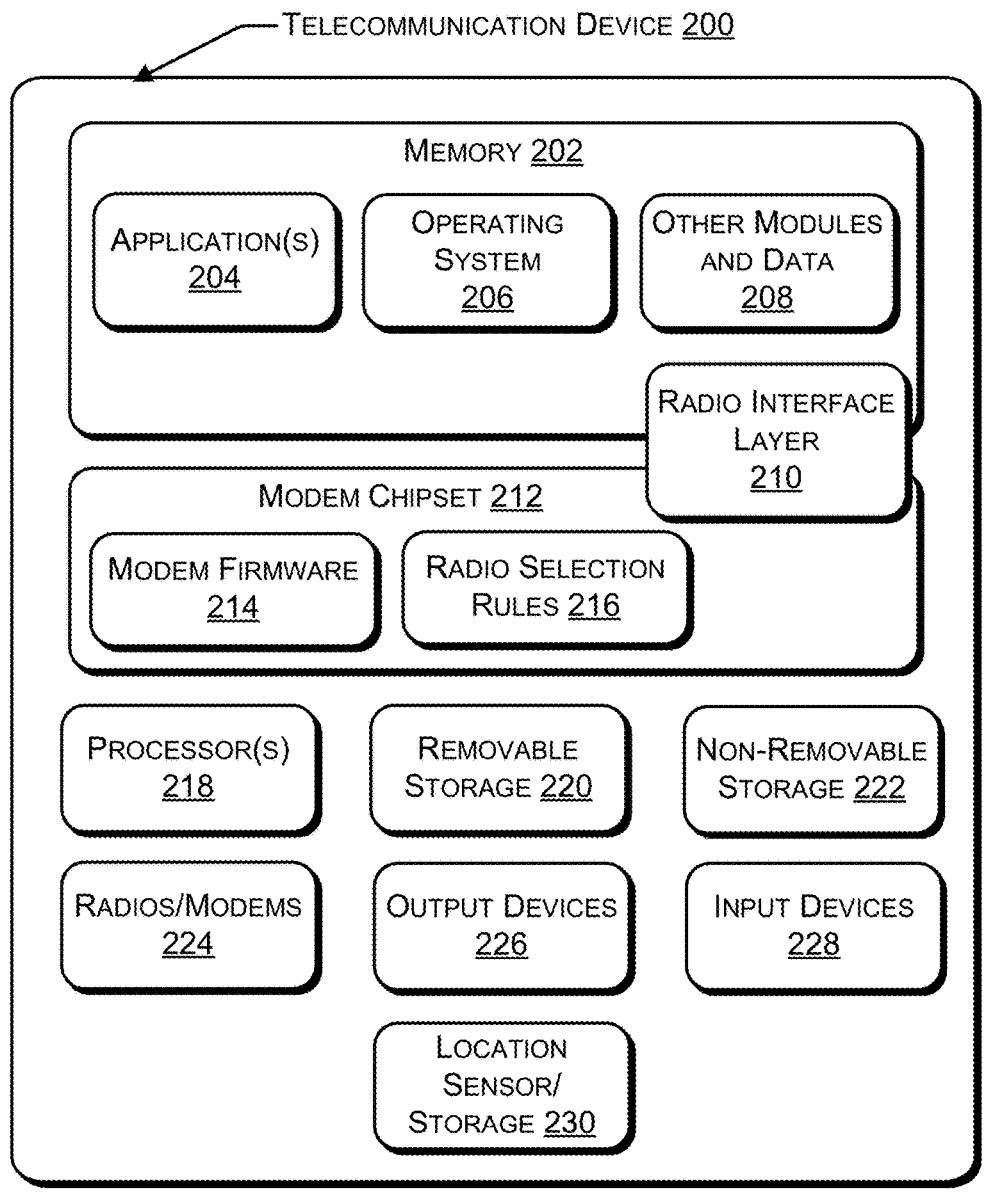
FIG. 2 illustrates a component level view of a telecommunication device configured to determine a radio selection rule based on a location of the telecommunication device and to scan network technologies and frequency bands in a priority order specified by the determined radio selection rule.

In various implementations, the telecommunication device 102 may be any sort of mobile telecommunication device. Such a mobile device may be or include a cellular phone, a smart phone, a tablet computer, a personal computer (PC), a laptop computer, a desktop computer, a workstation, a media player, an accessory device, or any other sort of device or devices. The telecommunication device 102 may be associated with a specific telecommunication network, such as telecommunication network 114, as the user of the telecommunication device 102 may subscribe to services offered by an operator of that telecommunication network. The telecommunication device 102 may include a modem for scanning and connecting to both that telecommunication network and other, visited telecommunication networks, and that modem may be associated with a set of radio selection rules 106. The telecommunication device may also store identifiers of last known cells or last known locations, or may have a global positioning system (GPS) component and may determine a location using one or more of these. An example telecommunication device 102 is illustrated in FIG. 2 and is described in detail below with reference to that figure.

The cells 104 may be cells of the telecommunication network 114, which may be any sort of telecommunication network and may comprise a core network and multiple access networks. Such a core network may include a number of network components providing connectivity between the cells 104, between cells 104 of the telecommunication network 114 and those of other telecommunication networks, and between cells 104 and devices of other networks. The core network may support packet-switched communications, circuit-switched communications, or both. Further, the core network may be a System Architecture Evolution (SAE) core network or a UNITS core network, or may include network components from both. Also, the core network may include an Internet Protocol (IP) Multimedia subsystem (IMS) layer for supporting packet-switched communications. Further, the core network may include the application server 116, as well as other devices.

In some implementations, each cell 104 may comprise a geographic area corresponding to an access network of the telecommunication network 114, that access network including one or more base stations. Such base stations may be implemented on cell towers and may each be associated with one or more radio access technologies (RATs). A base station may be, for instance, an eNode B associated with LTE RAT, a Node B associated with Fourth Generation (4G) or Third Generation (3G) RATs (e.g., UMTS or GSM RATs), or other sorts of base station, such as a base stations associated with Second Generation (2G) RATs. In addition to RATs (also referred to herein as network technologies), each base station me be associated with one or more frequency bands, those bands being tied to RATs. For example, a base station may be associated with an LTE RAT and the 700 MHz and 1900 MHz frequency bands. The same or a different base station may be associated with a GSM RAT and the 1900 MHz and 2100 MHz frequency bands.

Figure 3:
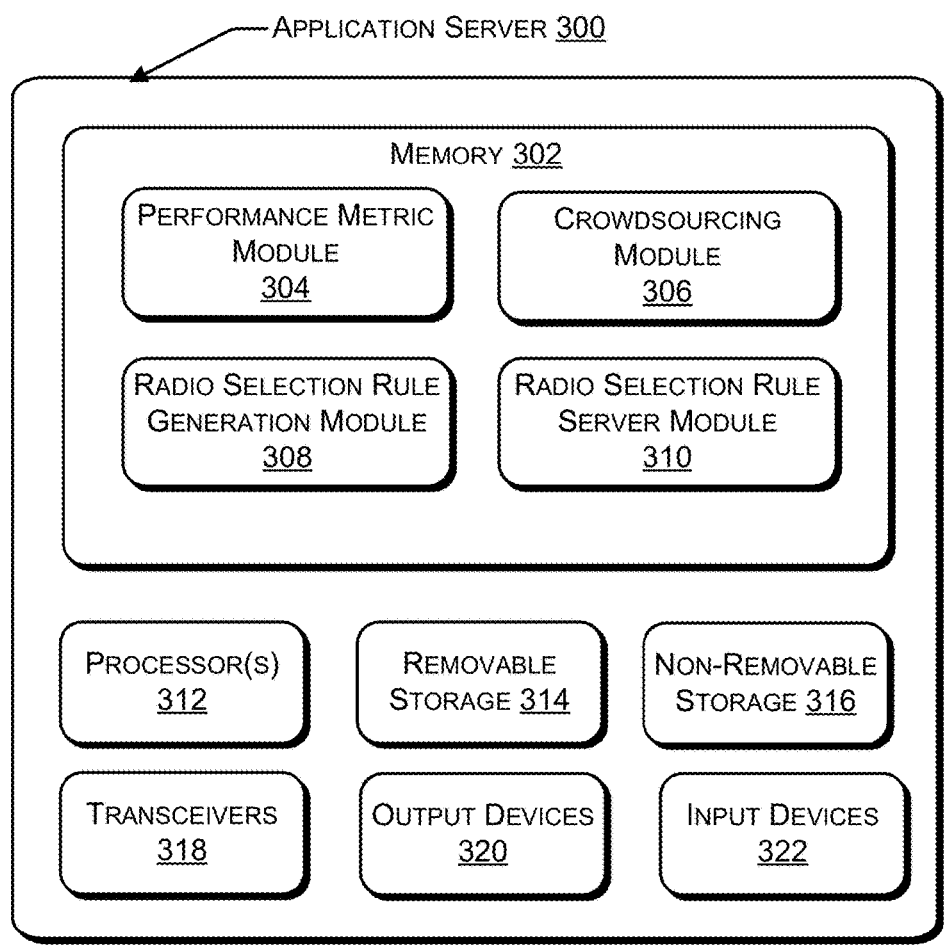
FIG. 3 illustrates a component level view of an application server configured to receive performance metrics for network technologies and frequency bands at different locations and to create or update radio selection rules based on those performance metrics.

In various implementations, the application server 116 may be or include one or more computing devices. Such computing devices may each be or include a server or server farm, multiple, distributed server farms, a mainframe, a work station, a PC, a laptop computer, a tablet computer, an embedded system, or any other sort of device or devices. In one implementation, ones of such computing devices represent a plurality of computing devices working in communication, such as a cloud computing network of nodes. An example application server 116 is illustrated in FIG. 3 and is described in detail below with reference to that figure.

As shown in FIG. 1, a telecommunication device 102 may be at any of a plurality of locations, each with one or more cells 104 proximate to that telecommunication device 102. When initially powered on, the telecommunication device 102 may be programmed to scan for a signal from a telecommunication network, such as telecommunication network 114. The telecommunication device 102 may perform that scan based on a radio selection rule 106 of a set of radio selection rules 106. The set of radio selection rules 106 may have been received from an application server 116 during a previous connection of the telecommunication device 102 to a telecommunication network. Each radio selection rule 106 of the set may be associated with a location and none, some, or all of the radio selection rules 106 of the set may be associated with an application or service (e.g., e911). The locations may be defined as cell identifiers, GPS coordinates, etc. Further, each radio selection rule 106 of the set may include at least a priority order of network technologies (e.g., LTE, then UMTS, then GSM). None, some, or all of the radio selection rules 016 of the set may also include frequency bands for a network technology, also in a priority order (e.g., LTE 700 MHz, then LTE 1900 MHz, then UMTS 1900 MHz, etc.). Also, because some network technologies or frequency bands may be unavailable certain locations, those unavailable network technologies or frequency bands would not appear in the radio selection rule(s) 106 for those locations.

In order to perform a scan based on a location-appropriate radio selection rule 106, the telecommunication device 102 first determines its location. And because the telecommunication device 102 is not yet connected to the telecommunication network in an initial scan, the telecommunication device 102 does not rely on the telecommunication network to obtain its location. Rather, the telecommunication device 102 may utilize a GPS component of the telecommunication device 102 to communicate with GPS satellites and obtain GPS coordinates. Alternatively or additionally, the telecommunication device 102 may rely on locally stored information, such as a last known location or last known cell identifier from a previous connection. Based on any or all of these, the telecommunication device 102 may determine a radio selection rule 106 appropriate to its location from the set of radio selection rules 106.

The telecommunication device 102 then scans for signals based on the priority order set forth in the determined radio selection rule 106. For example, as shown in FIG. 1, at location 1 and time 1, the determined radio selection rule 106 specifies first scanning for LTE 700 MHz, then scanning for LTE 1900 MHz, then scanning for GSM 2100 MHz, and then scanning for GSM 1900 MHz. When using such a rule 106, the telecommunication device 102 first scans for LTE 700 MHz. If a connection is available for that network technology at that frequency band, the telecommunication device 102 registers and connects and ceases scanning. If a connection is unavailable, then the telecommunication device 102 scans for LTE 1900 MHz, registers and connects if available, and if unavailable proceeds to scan GSM frequency bands. Thus, the scanning proceeds until an available network technology and frequency band are found. If none are available, the telecommunication device 102 waits for a period of time and then repeats scanning in the priority order set forth in the determined radio selection rule 106. As can be seen in FIG. 1, different radio selection rules 106 may be used at location 2, time 2 110 and location 2, time 3 118.

In some implementations, the telecommunication device 102 may determine a different radio selection rule 106 when utilizing emergency communication services such as e911. Such a radio selection rule 106 may be the default in any location for emergency communication services or may be an alternative, location-specific rule.

In further implementations, the telecommunication device 102 may associate multiple radio selection rules 106 with one or more of the locations, each such radio selection rule 106 being associated with one or more applications. In such implementations, when determining which radio selection rule 106 to use, the telecommunication device 102 may determine both a location and an active application. If multiple applications are active and associated with different radio selection rules 106, the telecommunication device 102 may utilize a separate rule prioritizing among the applications.

In various implementations, the set of radio selection rules 106 may include different rules for scanning and rescanning. Scanning may occur when the telecommunication device 102 is not connected to a telecommunication network and is seeking to connect to one; rescanning may occur when the telecommunication device 102 is connected to a telecommunication network and the telecommunication device 102 is scanning to determine whether a different network technology or frequency band is available. For example, during a scan, LTE may be unavailable, and the telecommunication device 102 may connect to GSM. At a subsequent time, the telecommunication device 102 may rescan, determining whether LTE has become available. In such implementations, one or more of the locations may be associated with at least two radio selection rules 106: one for scanning and one for rescanning. Alternatively, a same radio selection rule 106 may be used for both scanning and rescanning at a location.

In some implementations, the telecommunication device 102 may repeat the scanning or rescanning with differing frequencies depending on a subscription or priority level of a subscriber associated with the telecommunication device 102.

In addition to rule determination, scanning, and connection, the telecommunication device 102 may log metrics for the network technologies and frequency bands and any connections using them. Such performance metrics may indicate signal strength, packet loss, quality of service (QoS), qualify of user experience (QoE), or any number of measures of network congestion and connection availability. The telecommunication device 102 may also report these performance metrics to the telecommunication network and/or the application server 116 periodically.

In various implementations, the telecommunication device 102 receives updates to the set of radio selection rules 106 at 112 from the application server 116. These updates at 112 may occur periodically or may be event driven (e.g., driven by a change in network conditions). For example, as shown in FIG. 1, between time 2 and time 3, the telecommunication device 102 may receive an updated set of radio selection rules 106 at 112. The telecommunication device 102 may then utilize the updated set of radio selection rules 106 when determining a radio selection rule 106 at location 2, time 3 118.

In various implementations, the application server 116 may generate sets of radio selection rules 106 based on one or both of performance metrics received from telecommunication devices 102 or crowdsourcing. The application server 116 may receive the performance metrics directly from the telecommunication devices 102 or indirectly, through another node of the telecommunication network. The application server 116 may gather the crowdsourcing information from any of a number of sources, such as social media, RSS feeds, Internet data sources, or other crowdsourced feeds. For instance, comments on a social media site may refer to poor coverage at a specific location (e.g., a stadium). Also, in some implementations, the telecommunication devices 102 may contribute to the crowdsourcing information. The application server 116 may synthesize this information (performance metrics and/or crowdsourcing) to produce new sets of radio selection rules 106 or update existing sets of radio selection rules 106. For instance, a radio selection rule 106 may specify scanning LTE before GSM. Performance metrics may indicate, however, that LTE is very congested. In response, the application server 116 may update that radio selection rule 106 to reverse the priority order, specifying that GSM should be scanned before LTE.

In addition to creating or updating the sets of radio selection rules 106, the application server 116 may update the locations. Congestion conditions may cause cell boundaries to fluctuate, and the application server 116 may take this into account, modifying the location associated with a given radio selection rule 106.

In various implementations, once the application server 116 has created or updated the sets of radio selection rules 106, the application server 116 may serve those sets of radio selection rules 106 to telecommunication devices 102.

Example Devices

FIG. 2 illustrates a component level view of a telecommunication device configured to determine a radio selection rule based on a location of the telecommunication device and to scan network technologies and frequency bands in a priority order specified by the determined radio selection rule. As illustrated, the telecommunication device 200 comprises a system memory 202 storing application(s) 204, an operating system 206, other modules and data 208, and a part of the communication stack 202. Also, the telecommunication device 200 includes a modem 212, which includes modem firmware 214, radio selection rules 216 and a part of the radio interface layer 210, processor(s) 218, a removable storage 220, a non-removable storage 222, radios/modems 224, output device(s) 226, input device(s) 228, and a location sensor/storage 230.

In various implementations, system memory 202 is volatile (such as RAM), non-volatile (such as ROM, flash memory, etc.) or some combination of the two. The application(s) 204 may be example(s) of the application(s) of the telecommunication device 102. Such application(s) 204 may receive sets of radio selection rules 216, provide those sets of radio selection rules 216 to the modem chipset 212 through the operating system 206 and the radio interface layer 210, and receive and provide performance metrics to the telecommunication network.

The operating system 206 may be any sort of operating system and may enable the application(s) 204 to provide the radio selection rules 216 to the modem chipset 212.

The other modules or data 208 stored in the system memory 202 may comprise any sort of applications or platform components of the telecommunication device 200, as well as data associated with such applications or platform components.

The radio interface layer 210 may be an application programming interface implemented in part in memory 202 and in part in the modem chipset 212 and enabling pass through of radio selection rules 216 and performance metrics.

In various implementations, the modem chipset 212 may manage the radios and/or modems 224, causing them to scan network technologies and frequency bands and establish or terminate communication links over a network. The modem chipset 212 may also log connection or communication events and monitor performance metrics, such as QoS, delay, packet loss, etc. The modem firmware 214 may retrieve a location of the telecommunication device 200 from the location sensor/storage 230 (e.g., through the radio interface layer 210) and may determine a radio selection rule 216 associated with that location. The modem firmware 214 then scans in the priority order specified by the radio selection rule 216 until a suitable network technology and frequency band are found. The radio selection rules 216 may be refreshed on some basis by application server through the application(s) 204.

Figure 4:
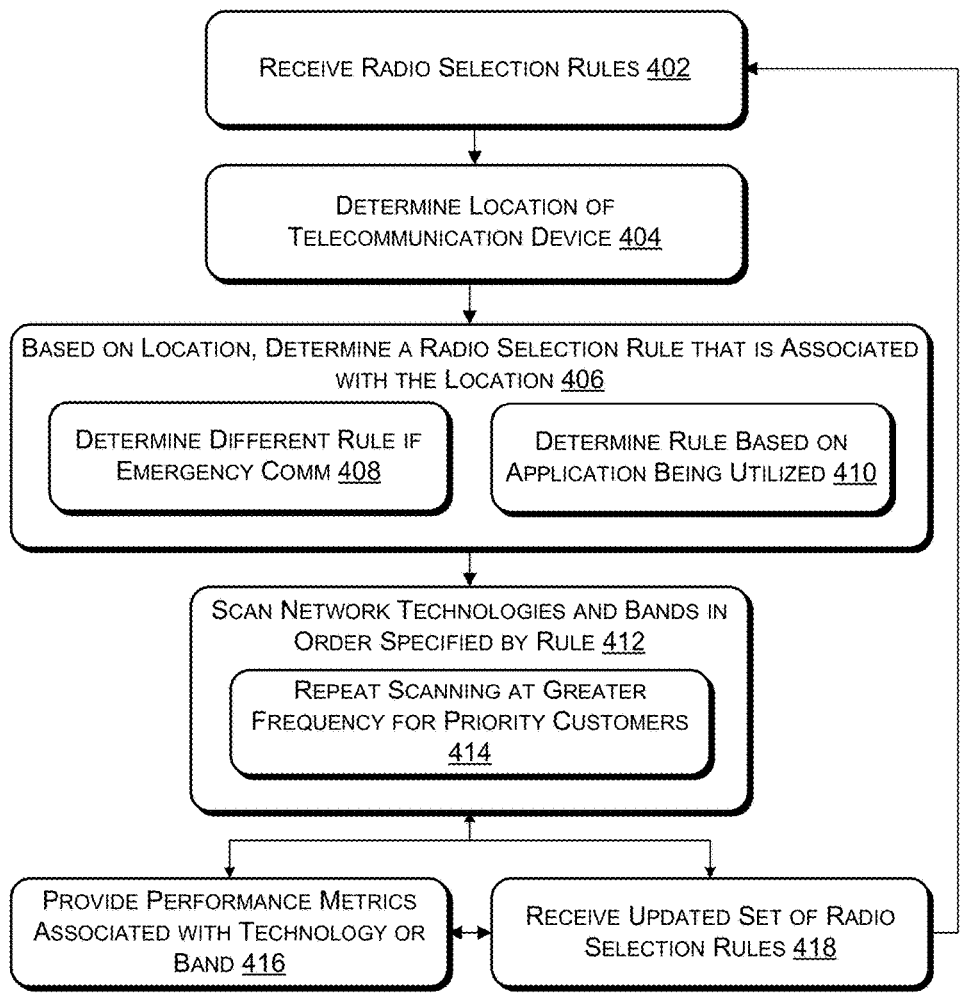
FIG. 4 illustrates an example process for a telecommunication device to determine a radio selection rule based on a location of the telecommunication device and to scan network technologies and frequency bands in a priority order specified by the determined radio selection rule.

Algorithm(s) implemented by the modules 204, 206, 208, 210, and 214 is/are illustrated by the flowcharts shown in FIG. 4.

In some implementations, the processor(s) 218 is a central processing unit (CPU), a graphics processing unit (GPU), or both CPU and GPU, or any other sort of processing unit.

The telecommunication device 200 may also include additional data storage devices (removable and/or non-removable) such as, for example, magnetic disks, optical disks, or tape. Such additional storage is illustrated in FIG. 2 by removable storage 220 and non-removable storage 222.

Non-transitory computer-readable media may include volatile and nonvolatile, removable and non-removable tangible, physical media implemented in technology for storage of information, such as computer readable instructions, data structures, program modules, or other data. System memory 202, removable storage 220 and non-removable storage 222 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the telecommunication device 200. Any such non-transitory computer-readable media may be part of the telecommunication device 200.

In some implementations, the radios and/or modems 224 include any sort of radio, modems, or combinations thereof known in the art. For example, radios and/or modems 224 may include a radio transceiver that performs the function of transmitting and receiving radio frequency communications via an antenna. The radios and/or modems 224 may facilitate wireless connectivity between the telecommunication device 200 and various devices or one or more networks. In addition, the radios and/or modems 224 may also include a wireless communication transceiver and a near field antenna for communicating over unlicensed wireless IP networks, such as local wireless data networks and personal area networks (e.g., Bluetooth or near field communication (NFC) networks). Further, the radios and/or modems 224 may include wired communication components, such as an Ethernet port, that connect the network device 200 in a wired fashion to devices of one or more networks. In various implementations, the radios and/or modems 224 may interface with and be controlled by the modem chipset 212.

In some implementations, the output devices 226 include any sort of output devices known in the art, such as a display (e.g., a liquid crystal display), speakers, a vibrating mechanism, or a tactile feedback mechanism. Output devices 226 also include ports for one or more peripheral devices, such as headphones, peripheral speakers, or a peripheral display.

In various implementations, input devices 228 include any sort of input devices known in the art. For example, input devices 228 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The location sensor/storage 230 may include any or all of a GPS component or storage for either or both of a last known cell identifier or a last known location. The GPS component may communicate with a GPS satellite to obtain a current location of the telecommunication device 200, which may then be stored for subsequent use. The storage may record a location obtained from any number of sources, such as base stations, a network, or the GPS component. The storage may also record the cell identifier of the last cell that the telecommunication device 200 connected to.

FIG. 3 illustrates a component level view of an application server configured to receive performance metrics for network technologies and frequency bands at different locations and to create or update radio selection rules based on those performance metrics. As illustrated, the application server 300 comprises a system memory 302 storing a performance metric module 304, a crowdsourcing module 306, a radio selection rule generation module 308, and a radio selection rule server module 310. Also, the application server 300 includes processor(s) 312, a removable storage 314, a non-removable storage 316, transceivers 318, output device(s) 320, and input device(s) 322.

In various implementations, system memory 302 is volatile (such as RAM), non-volatile (such as ROM, flash memory, etc.) or some combination of the two. The performance metric module 304 may receive performance metrics from any number of telecommunication devices regarding cells of the telecommunication network, reporting which network technologies are available, which frequency bands are available, how crowded those technologies and bands are, etc. . . . . The crowdsourcing module 306 may gather similar performance metrics but from social media, RSS feeds, the Internet, etc. The radio selection rule generation module 308 may update location boundaries based on the performance metrics and may create or update radio selection rules and their priority orders based on the performance metrics. The radio selection rule server module 310 may provide radio selection rules to telecommunication devices upon creating or updating of those radio selection rules. Algorithm(s) implemented by the performance metric module 304, crowdsourcing module 306, radio selection rule generation module 308, and radio selection rule server module 310 is/are illustrated by the flowcharts shown in FIG. 5.

In some implementations, the processor(s) 312 is a central processing unit (CPU), a graphics processing unit (GPU), or both CPU and GPU, or any other sort of processing unit.

The application server 300 may also include additional data storage devices (removable and/or non-removable)

such as, for example, magnetic disks, optical disks, or tape. Such additional storage is illustrated in FIG. 3 by removable storage 314 and non-removable storage 316.

Non-transitory computer-readable media may include volatile and nonvolatile, removable and non-removable tangible, physical media implemented in technology for storage of information, such as computer readable instructions, data structures, program modules, or other data. System memory 302, removable storage 314 and non-removable storage 316 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the application server 300. Any such non-transitory computer-readable media may be part of the application server 300.

In some implementations, the transceivers 318 include any sort of transceivers known in the art. For example, the transceivers 318 may include wired communication components, such as an Ethernet port, for communicating with other networked devices. Also or instead, the transceivers 318 may include wireless modem(s) to may facilitate wireless connectivity with other computing devices. Further, the transceivers 318 may include a radio transceiver that performs the function of transmitting and receiving radio frequency communications via an antenna.

In some implementations, the output devices 320 include any sort of output devices known in the art, such as a display (e.g., a liquid crystal display), speakers, a vibrating mechanism, or a tactile feedback mechanism. Output devices 320 also include ports for one or more peripheral devices, such as headphones, peripheral speakers, or a peripheral display.

In various implementations, input devices 322 include any sort of input devices known in the art. For example, input devices 322 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 5:
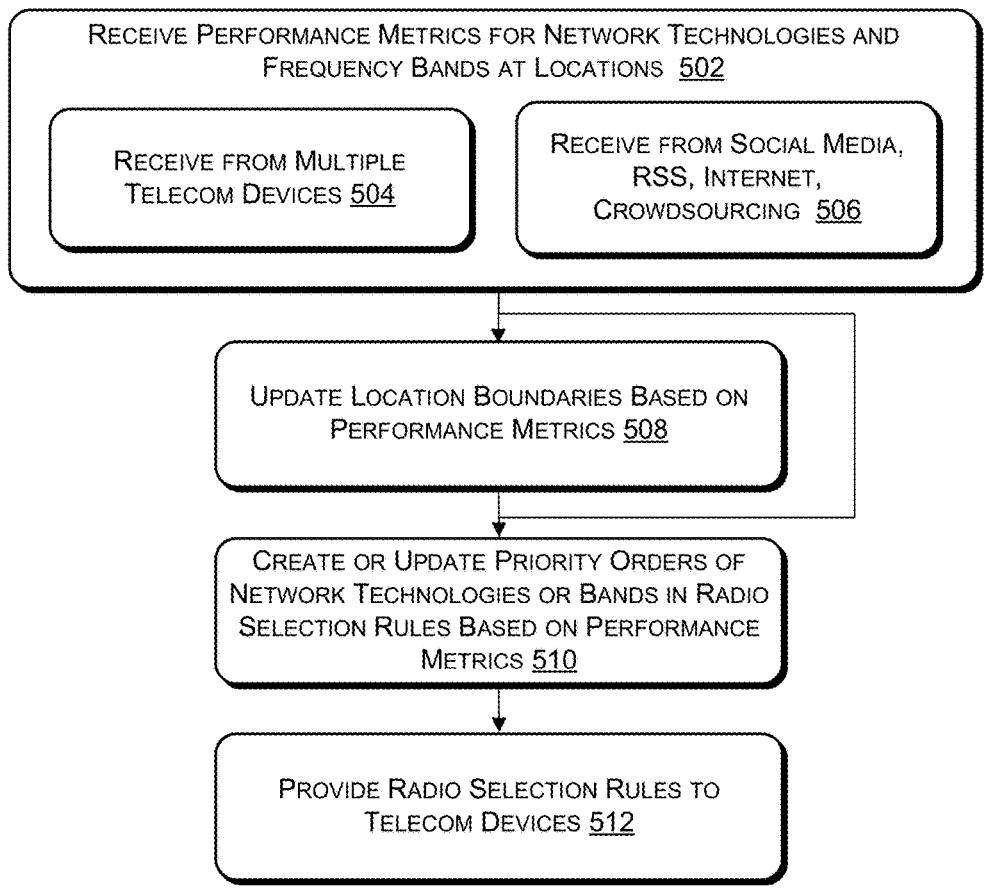
FIG. 5 illustrates an example process for an application server to receive performance metrics for network technologies and frequency bands at different locations and to create or update radio selection rules based on those performance metrics.

FIGS. 4-5 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process for a telecommunication device to determine a radio selection rule based on a location of the telecommunication device and to scan network technologies and frequency bands in a priority order specified by the determined radio selection rule. The process includes, at 402, receiving, by a telecommunication device, a set of radio selection rules. Each radio selection rule in the set of radio selection rules is associated with a different location, and at least two radio selection rules of the set of radio selection rules are associated with different priority orders of network technologies and frequency bands. Further, each radio selection rule of the set of radio selection rules may include a priority order of network technologies and, for each network technology associated with multiple frequency bands, a priority order of frequency bands for that network technology. The network technologies may include LTE, HSPA, UMTS, or GSM. In some implementations, the set of radio selection rules includes different radio selection rules for scanning and rescanning at a given location.

At 404, the telecommunication device may determine a location of the telecommunication device. The telecommunication device may determine the location of the telecommunication device by using GPS or by referencing a last known location of the telecommunication device or a last known cell identifier of the telecommunication device.

At 406, based at least on a location of the telecommunication device, the telecommunication device determines a radio selection rule in the set of radio selection rules that is associated with the location. At 408, the determining may comprise determining a different radio selection rule if the user of the telecommunication device is engaged in an emergency communication. At 410, the location of the telecommunication device may be associated with multiple radio selection rules of the set of radio selection rules, and the determining may include determining the radio selection rule based at least in part on an application being utilized on the telecommunication device.

At 412, the telecommunication device scans network technologies and frequency bands in a priority order specified by the determined radio selection rule to determine a network technology and frequency band to connect to. In some implementations, the radio selection rules for some locations do not mention some network technologies, resulting in those network technologies not being scanned when the telecommunication device is at one of those locations. At 414, the telecommunication device may repeat the scanning at a greater frequency if the telecommunication device is associated with a priority customer.

At 416, the telecommunication device may provide performance metrics associated with at least one of network technologies or frequency bands to a telecommunication network.

At 418, the telecommunication device may receive an updated set of radio selection rules in which at least one radio selection rule has different priority order for a given location than a radio selection rule for the given location in the set of radio selection rules. In some implementations, the updated set of radio selection rules may have been generated from the set of radio selection rules based at least in part on the performance metrics.

FIG. 5 illustrates an example process for an application server to receive performance metrics for network technologies and frequency bands at different locations and to create or update radio selection rules based on those performance metrics. The process includes, at 502, receiving, by an application server of a telecommunication network, for each location of a plurality of locations, performance metrics for network technologies and frequency bands at that location.

At 504, the receiving of the performance metrics comprises receiving the performance metrics from a plurality of telecommunication devices. At 506, the receiving of the performance metrics comprises receiving the performance metrics from social media, RSS feeds, Internet data sources, or other crowdsourced feeds.

At 508, the application server adjusts location boundaries associated with locations mapped to ones of a set of radio selection rules based on the performance metrics. Each radio selection rule in the set of radio selection rules includes a priority order of network technologies and, for each network technology associated with multiple frequency bands, a priority order of frequency bands for that network technology.

At 510, the application server creates or updates the priority orders of network technologies and frequency bands in the radio selection rules respectively associated with the plurality of locations based on the received performance metrics.

At 512, the application server provides the radio selection rules to at least one telecommunication device. At least two radio selection rules of the set of radio selection rules are associated with different priority orders of network technologies and frequency bands.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, by a telecommunication device, a set of radio selection rules, each radio selection rule in the set of radio selection rules being associated with a different location;
based at least on a location of the telecommunication device, determining, by the telecommunication device, a radio selection rule in the set of radio selection rules that is associated with the location;
scanning, by the telecommunication device, network technologies and frequency bands in a priority order specified by the determined radio selection rule to determine a network technology and frequency band to connect to;
receiving, by the telecommunication device, an updated set of radio selection rules, the updated set of radio selection rules differing from the set of radio selection rules in that boundaries of a location mapped to a radio selection rule of the set of radio selection rules are adjusted in the updated set of radio selection rules; and
based at least on the location of the telecommunication device, determining, by the telecommunication device, an updated radio selection rule in the updated set of radio selection rules,
wherein the radio selection rule and the updated radio selection rule are associated with different priority orders of network technologies and frequency bands.

2. The method of claim 1, wherein each radio selection rule of the set of radio selection rules includes a priority order of network technologies and, for each network technology associated with multiple frequency bands, a priority order of frequency bands for that network technology.

3. The method of claim 2, wherein the network technologies include Long Term Evolution (LTE), High Speed Packet Access (HSPA), Universal Mobile Telecommunications System (UMTS), or Global System for Mobile Communications (GSM).

4. The method of claim 1, further comprising providing performance metrics associated with at least one of network technologies or frequency bands to a telecommunication network.

5. The method of claim 1, further comprising receiving the updated set of radio selection rules, the updated set of radio selection rules having been generated from the set of radio selection rules based at least in part on the performance metrics.

6. The method of claim 1, further comprising determining the location of the telecommunication device by using a global positioning system (GPS) or by referencing a last known location of the telecommunication device or a last known cell identifier of the telecommunication device.

7. The method of claim 1, wherein the radio selection rules for some locations do not mention some network technologies, resulting in those network technologies not being scanned when the telecommunication device is at one of those locations.

8. The method of claim 1, wherein the telecommunication device repeats the scanning at a greater frequency if the telecommunication device is associated with a priority customer.

9. The method of claim 1, wherein the determining comprises determining a different radio selection rule if the user of the telecommunication device is engaged in an emergency communication.

10. The method of claim 1, wherein the location of the telecommunication device is associated with multiple radio selection rules of the set of radio selection rules, and the determining includes determining the radio selection rule based at least in part on an application being utilized on the telecommunication device.

11. The method of claim 1, wherein the set of radio selection rules includes different radio selection rules for scanning and rescanning at a given location.

12. A telecommunication device comprising:
a processor;
a modem communicatively coupled to the processor; and
modem firmware associated with the modem and operable by the processor to perform operations including:
receiving a set of radio selection rules, each radio selection rule in the set of radio selection rules being associated with a different location;
based at least on a location of the telecommunication device, determining a radio selection rule in the set of radio selection rules that is associated with the location;
scanning network technologies and frequency bands in a priority order specified by the determined radio selection rule to determine a network technology and frequency band to connect to;
receiving an updated set of radio selection rules, the updated set of radio selection rules differing from the set of radio selection rules in that boundaries of a location mapped to a radio selection rule of the set of radio selection rules are adjusted in the updated set of radio selection rules; and
based at least on the location of the telecommunication device, determining an updated radio selection rule in the updated set of radio selection rules, wherein the radio selection rule and the updated radio selection rule are associated with different priority orders of network technologies and frequency bands.

13. The telecommunication device of claim 12, wherein the application is to receive the set of radio selection rules from a telecommunication network, and the telecommunication device further comprises an operating system and a radio interface layer to interface between the operating system and the modem firmware, wherein the application is to provide the set of radio selection rules to the modem firmware through the operating system and radio interface layer.

14. The telecommunication device of claim 13, wherein the application is further to report performance metrics for network technologies and bands at one or more locations.

15. The telecommunication device of claim 12, wherein the location of the telecommunication device is associated with multiple radio selection rules of the set of radio selection rules, and the determining includes determining the radio selection rule based at least in part on an application being utilized on the telecommunication device.

16. A non-transitory computer-readable medium having stored thereon a plurality of programming instructions that, when executed by an application server of a telecommunication network, cause that application server to perform operations comprising:

receiving, for each location of a plurality of locations, performance metrics for network technologies and frequency bands at that location;

creating or updating priority orders of network technologies and frequency bands in radio selection rules respectively associated with the plurality of locations based on the received performance metrics;

adjusting boundaries associated with locations mapped to ones of the radio selection rules; and providing the radio selection rules to at least one telecommunication device, wherein at least two radio selection rules of the radio selection rules are associated with different priority orders of network technologies and frequency bands.

17. The non-transitory computer-readable medium of claim 16, wherein each radio selection rule of the radio selection rules includes a priority order of network technologies and, for each network technology associated with multiple frequency bands, a priority order of frequency bands for that network technology.

18. The non-transitory computer-readable medium of claim 16, wherein the receiving of the performance metrics comprises receiving the performance metrics from a plurality of telecommunication devices.

19. The non-transitory computer-readable medium of claim 16, wherein the receiving of the performance metrics comprises receiving the performance metrics from social media, really simple syndication (RSS) feeds, Internet data sources, or other crowdsourced feeds.

* * * * *